United States Patent Office 2,884,088
Patented Apr. 28, 1959

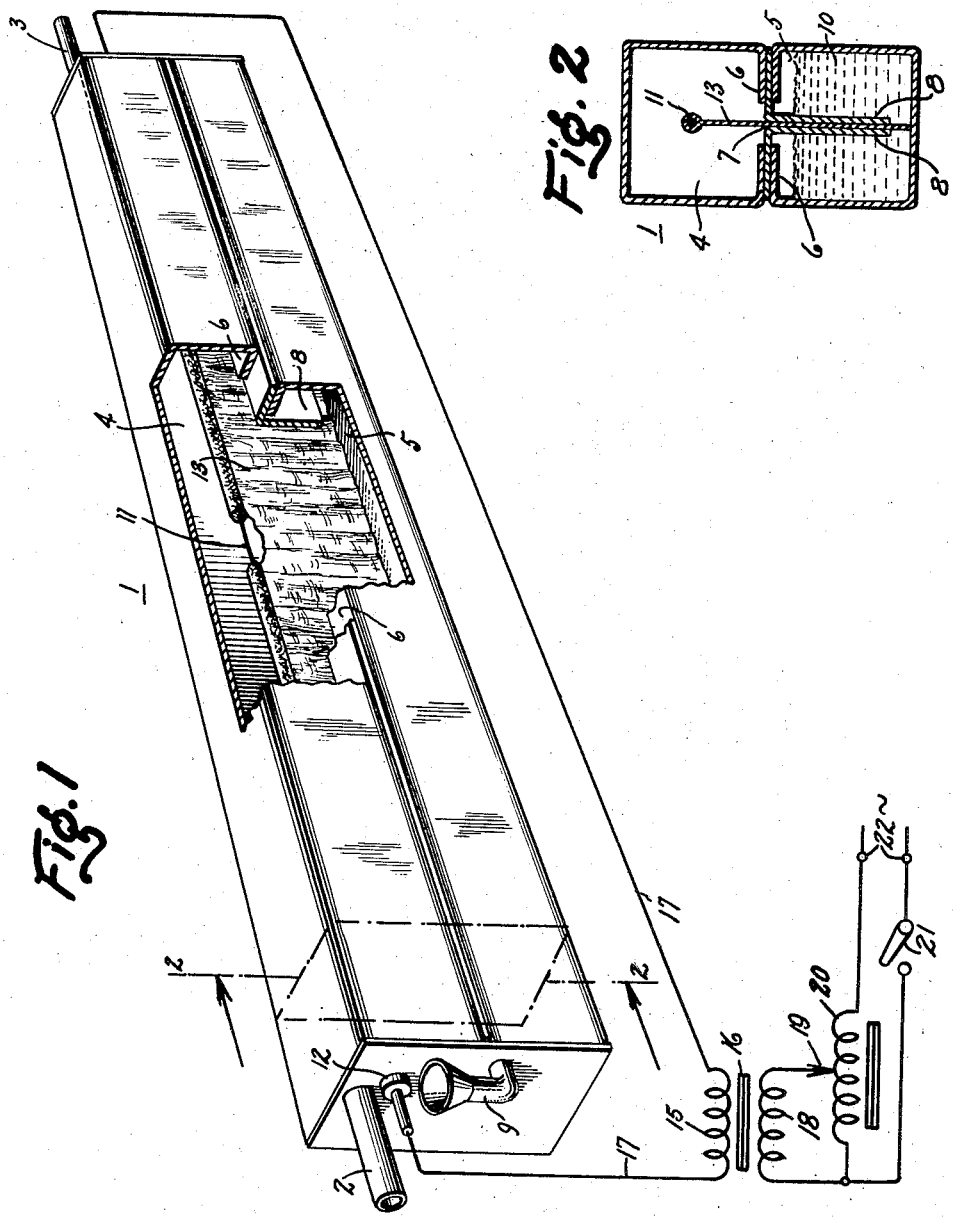

2,884,088

SMALL PARTICLE FILTER

Theodore A. Rich, Schenectady, N.Y., assignor to General Electric Company, a corporation of New York Application November 29, 1956, Serial No. 625,192

3 Claims. (Cl. 183—32)

This invention relates to a method and apparatus for filtering small particles. More specifically, it relates to a method and apparatus for filtering those particles usually denominated as condensation nuclei.

Human activities, as exemplified in industrial processes, are producers of prodigious quantities of condensation nuclei. For example, combustion processes of various types are accompanied by the liberation of very high concentrations of condensation nuclei. Similarly, condensation nuclei are produced in large quantities during photochemical conversion processes such as take place when a gas such as $SO_2$ is converted by sunlight to $SO_3$. The burning of coal, oil, and gasoline, all of which contain sulfur, produces large quantities of $SO_2$ which, in turn, are converted by means of this photochemical action into condensation nuclei.

Chemical reactions in which metallic carbonyls are formed have also been found to produce rather large quantities of condensation nuclei, the metallic carbonyl particles thus formed acting as condensation nuclei.

Electrical arcing phenomena have been found to produce copious quantities of condensation nuclei which are constituted of vaporized contact material.

In all of these processes, which are but a partial enumeration, the condensation nuclei produced may be utilized to provide a very accurate indication of the nature of the process as well as the manner in which it is proceeding. Consequently, a very powerful tool for monitoring various industrial processes is available.

However, in utilizing condensation nuclei as an analytical tool in monitoring these various industrial processes, it has been found that the freshly born condensation nuclei most accurately reflect the conditions taking place. These virgin nuclei, however, lie primarily in the size range of $10^{-7}$ cm. radius and smaller. As the freshly born condensation nuclei age they recombine or coagulate with other nuclei to form larger particles usually running in the size range from $10^{-4}$ cm. radius to $10^{-6}$ cm. radius. Since these larger condensation nuclei essentially represent the older nuclei population, it is desirable to eliminate the larger condensation nuclei and only detect and measure the smaller nuclei since these reflect process conditions much more accurately. Since most condensation nuclei measuring devices measure the total number of condensation nuclei present, it is extremely desirable to eliminate the larger particles while leaving those smaller nuclei which are most significant as condition-indicating means.

Condensation nuclei is a generic name given to those small particles which are characterized by the fact that they serve as the nucleus on which a fluid, such as water for example, will condense to form droplets. Such condensation nuclei encompass microscopic and submicroscopic particles, the most important segment of the size spectrum, numerically lying in a range extending from approximately $2.5 \times 10^{-7}$ cm. radius to $1 \times 10^{-5}$ cm. radius.

It should be understood, however, that although this is the most numerically significant portion of the size spectrum, particles larger than $1 \times 10^{-5}$ cm. radius as well as particles smaller than $2.5 \times 10^{-7}$ cm. radius are included in the term condensation nuclei. As this term is understood in the art, it encompasses those particles of microscopic and sub-microscopic size which have this characteristic as serving as the nucleus for droplet formation. The smallest particle which meets this condition is a single ionized molecule and there is no upper limit in theory. In general usage the upper limit is the largest size particle which remains air-borne for an appreciable time, which is something in the order of $10^{-4}$ cm. radius.

The mechanism involved in the condensation of water vapor about such nuclei is dependent both on the relative humidity and on the size of the nuclei. If the humidity of a gas or air mass rises by a sufficient amount above 100%, condensation starts the deposition of water on the nuclei to achieve equilibrium condition. The deposition of water continues until the humidity is lowered to the new equilibrium condition representing substantially 100% relative humidity for the new temperature. The relationship between relative humidity and particle size which controls the initiation of condensation on small particles is shown by the following table:

| Size: | Relative humidity, percent |
|---|---|
| $10^{-7}$ cm. radius | 350 |
| $10^{-6}$ cm. radius | 112 |
| $10^{-5}$ cm. radius | 101 |
| $10^{-4}$ cm. radius | 100.1 |

The relationship between particle size and relative humidity illustrated in the table above shows quite clearly that for particles smaller than $10^{-4}$ cm. radius the relative humidity varies quite rapidly as the order of magnitude of these particles descends. In fact, for particles of $10^{-5}$ cm. radius and less, relatively high degrees of supersaturation are necessary in order to produce condensation about these particles. It becomes clear in analyzing these relationships that it is possible to discriminate between particles of different sizes by controlling the degree of supersaturation and causing condensation on all particles larger than a given size while yet not affecting particles smaller than that size. Thus, there is available a significant mechanism for filtering out discrete portions of the size spectrum.

The relationship between relative humidity and particle size necessary to the initiation of drop condensation about the nuclei thus presents a very promising approach to the problem of removing the larger size particles lying in the range of $1 \times 10^{-4}$ cm. radius to $4 \times 10^{-6}$ cm. radius.

Accordingly, it is an object of this invention to provide a method and apparatus for filtering small particles of the type known as condensation nuclei.

Another object of this invention is to provide a method and apparatus for filtering small particles which rely on their property of acting as the nucleus of a fluid drop.

A further object of this invention is to provide a method and apparatus for filtering small particles in which the size range of particles removed is variable.

Yet another object of this invention is to provide a method and apparatus for filtering condensation nuclei larger than a given size wherein a controlled degree of supersaturation is achieved to provide a mechanism for removing the desired particles.

Other objects and advantages will appear as the description of the invention proceeds.

In accordance with the invention, the foregoing objects are accomplished by providing an apparatus including a chamber means adapted to have a particle bearing gaseous medium flow therethrough. Positioned within the chamber is a source of liquid which is controllably vaporized in order to provide a controlled degree of supersaturation. A heating means is also positioned within the chamber to provide a source of heat for vaporizing a portion of the fluid in order to achieve the proper degree of supersaturation within the chamber means. Simultaneously, a temperature gradient is established within the chamber to produce supersaturation therein. By varying the amount of heat it is possible to vary the temperature gradient and consequently the degree of supersaturation achieved. The particles suspended in the gaseous medium in passing through the chamber are subjected to the effects of the supersaturated condition therein. Those particles which are larger than the critical size for the given degree of supersaturation, trigger the condensation mechanism and water droplets form thereabout, which droplets, in the course of the passage through the chamber, are deposited on the walls or chamber surfaces. The particles smaller than the critical size are, of course, unaffected by the vapor in the air and pass out of the chamber and are applied to a condensation nuclei measuring device in order to provide an accurate and sensitive indication of the condition being monitored.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

Figure 1 shows a perspective view partially broken away of the novel filter apparatus;

Figure 2 is a sectional view of the filter taken along the line 2—2 of Figure 1.

Referring now to Figure 1, there is illustrated an apparatus embodying the principles of the instant invention including a filter assembly which is adapted to have a particle bearing gaseous medium pass therethrough. To this end there is provided an elongated chamber 1 having an input conduit 2 and an output conduit 3. The input conduit 2 extends to the area to be monitored, not illustrated, and provides a continuous flow of a particle bearing gaseous medium to the filter. The output conduit may be connected to a condensation nuclei measuring device which provides an indication of the number of particles of the condensation nuclei type present in the gaseous medium. An example of such a condensation nuclei measuring device which may be utilized in conjunction with this filter assembly may be found in Patent No. 2,684,008 issued July 20, 1954, to Bernard Vonnegut, and assigned to the General Electric Company.

The elongated filter assembly chamber 1 is constituted of two adjacent horizontally extending rectangular chamber portions 4 and 5 which may be seen most clearly with reference to Figure 2. The upper chamber portion 4 is adapted to have the particle bearing gaseous medium pass therethrough while the lower chamber portion 5 acts as a reservoir for a vaporizable fluid 10 such as distilled water, which is utilized to provide the proper degree of supersaturation within the chamber 4. A pair of transverse walls 6 containing longitudinal slots form an opening communicating between the upper and lower chambers. A pair of L-shaped baffle plates 8 fastened between the transverse walls 6 and extending into lower chamber 5 provide a communicating channel 7 between the two chambers. An access conduit 9 is provided to facilitate filling the reservoir chamber 5 with distilled water 10.

Positioned in the upper chamber 4 is a heating means adapted to vaporize a portion of the fluid in order to establish a desired degree of supersaturation within the upper chamber. Positioned in the upper chamber and extending longitudinally thereof is an electrical heating element 11 of the resistance wire type which, upon the flow of current therethrough, acts as a heating element.

The resistance wire 11, in addition to vaporizing a portion of the fluid, establishes a temperature gradient extending radially therefrom to the walls of the chamber 4 which, as described in detail later, is essential in the production of the supersaturation within the chamber.

A fluid absorbent means in juxtaposition with the heating wire 11 extends into the reservoir chamber 5. To this end, there is provided a wicking material 13, such as linen or the like, which is wrapped around the resistance wire 11 and extends through the longitudinal opening 7 formed by the baffle plates 8 into the lower reservoir chamber 5. The wicking 13 by capillary action provides a continuous supply of vaporizable fluid to the heating element 11, thus maintaining the vapor supply and preventing depletion thereof during the condensation process.

In addition, there is provided a means for varying the degree of supersaturation by varying the rate of vaporization. In this manner it is possible to control the particle size range which is filtered out by means of this assembly. The opposite ends of heat producing resistance wire 11 extend through the chamber end walls through insulating bushings 12 and are connected to the secondary 15 of a suitable iron core transformer 16 by means of any pair of convenient wires 17. The primary 18 of the transformer is connected to one end of a single continuous autotransformer winding 20 while the other end of the primary is connected to a movable tap 19 on the autotransformer winding. The winding 20 is connected through a single pole-single throw switch 21 to any suitable source of alternating current energizing voltage 22 which, for the sake of convenience and simplicity, is not illustrated. Thus, by varying the position of the movable tap 19 the amount of current flowing through the heat producing resistance wire 11 may be varied in order to control the degree of supersaturation produced within the upper chamber 4 and consequently the size of particles to be filtered out.

While it is not intended that the scope of the invention be limited by any particular theory of operation, it is believed that the following mechanism takes place within the filter assembly. The flow of current through the resistance wire 11 produces heat which occasions a temperature rise in the vicinity of the resistance wire. First, water present in the wick element 13 is vaporized and passes into the air space of the upper chamber 4. In addition, a temperature gradient is established between the resistance wire 11 and the wall of the chamber 4, since the chamber wall is maintained at ambient temperature. Thus, in progressing radially outward from the wire to the wall, the temperature becomes progressively cooler. The water vapor pressure in the chamber 4, on the other hand, is constant throughout the chamber. With these two conditions existing simultaneously in the chamber, that is, a constant vapor pressure plus a temperature gradient, the relative humidity must increase as the distance radially outward from the heating wire. This can be seen most clearly by examining the formula for relative humidity.

$$\text{Relative Humidity} = \frac{\text{Actual Vapor Pressure}}{\text{Saturated Pressure at Given Temperature}}$$

It can be seen from this formula that if the actual vapor pressure at every point remains constant whereas the saturated pressure decreases with the distance radially outward from the heating element 11, the relative humidity increases with radial distance since the temperature decreases progressively and, consequently, decreases the value of saturated pressure at successive points along the radial distance.

The relative humidity in the immediate vicinity of the heating element 11 is 100% for that temperature. However, moving radially outward from the heating element towards the wall the temperature drops and, consequently, the relative humidity at these points is progressively higher than 100% and a progressively increasing supersaturated condition exists. The maximum degree of supersaturation obtained depends on the temperature differential between the heating element 11 and the wall temperature. Thus, it is clear that there is achieved within the upper chamber 4 a controllable degree of supersaturation which is dependent on the temperature gradient established and the amount of water vapor present.

The particle bearing gaseous medium which flows through the filter is thus subjected to a supersaturated condition within the assembly. Hence, all particles larger than a critical size, depending on the maximum degree of supersaturation achieved, trigger a mechanism which initiates condensation of the vapor suspended in the air about all nuclei larger than this critical size. The water droplets thus formed continue to aborb more water and grow in size and in passing through the length of the chamber are deposited on the walls removing them from the gaseous medium. As a consequence, the gaseous medium in passing out of the filter assembly has been freed of all particles larger than a given critical size.

In order to insure that an assembly of this type operates with the greatest efficiency, it is necessary that a continuous supply of water be present so that the condensation mechanism within the chamber be continuous. As has been pointed out previously, when the condensation process is initiated it tends to reach an equilibrium condition at a relative humidity of 100% by abstracting water from the air. If the supply of water vapor in the air is not continuously replenished, and there are sufficient condensation nuclei in the air, sufficient vapor is removed so that this equilibrium condition of 100% relative humidity is eventually reached and the condensation process ceases. Therefore, in order to allow continuous condensation it is necessary that the vapor supply of the air be continuously replenished. It is for this reason that the water absorbent wick 13 extends throughout the length of the chamber 4. In this fashion, vapor is continuously added to the air and the supersaturated condition is maintained.

An additional need for maintaining sufficient vapor in the air space is to replace the vapor which is lost by condensation on nuclei. Small droplets initially formed should continue to grow to a larger size to increase the probability that these droplets will be deposited on the chamber walls and removed from the gas stream. Thus, it is also desirable to make the chamber and the total assembly of sufficient length to insure that the droplets are deposited on the walls. In this manner, by keeping a continuous supply of water vapor available in the air, and by making the chamber of sufficient length, all particles larger than the critical size determined by the maximum degree of supersaturation will be filtered out by means of the condensation mechanism just described.

It can be seen that the maximum supersaturation is near the colder walls. If the flow of gas were purely laminar some particles would never encounter high humidity. However, the heat from the wire sets up a sufficient degree of turbulence to insure that all particles do encounter the high humidity regions. If this were not so it would be necessary to induce turbulence by appropriate vanes or deflectors.

From the previous description it becomes obvious that by increasing the temperature gradient and the temperature differential established between the heating element and the wall, the degree of supersaturation may be increased and, consequently, the size of particles filtered may be controlled. By increasing the current flowing through the resistance wire heating element and changing the temperature differential, the amount of supersaturation present in the chamber may be increased and, consequently, smaller particles are filtered.

As was pointed out previously, it is desirable that the fluid contained in the lower reservoir chamber 5 contain no mineral residue. Hence, if water is used as the vaporizable fluid it is advantageous that only distilled water be used since any mineral residue in the water tends to clog the wicking and interferes with an adequate supply of water. Since an adequate supply of vapor in the air space, as has been explained, is necessary for the most efficient operation of this assembly, it is extremely desirable to utilize distilled water as the fluid.

From the foregoing description, it can be appreciated that the instant invention provides a highly efficient apparatus and method for removing from a particle bearing gaseous medium substantially all particles larger than a given critical size, which particles belong to that category known as condensation nuclei.

While a particular embodiment of this invention has been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a continuous small particle filter, the combination comprising means defining an elongated chamber having an inlet for admitting a particle bearing gaseous medium and an outlet from which the filtered gaseous medium exits, means positioned within said chamber to remove entrained particles from said gaseous medium according to size by producing selective condensation of vapor about all particles above a given size to form droplets which are removed from the gaseous medium by deposition in the chamber, said last named means including heating means extending substantially the entire length of the chamber to establish a temperature gradient in said chamber space between said heating means and said chamber defining means, a reservoir means adapted to hold a vaporizable fluid communicating with said heating means substantially along its entire length to vaporize a portion of the fluid and produce a condition of controlled supersaturation substantially along the entire length of said chamber so that filtering action takes place continuously during passage of said gaseous medium through said chamber, and means to control said heating means to vary the temperature gradient and the supersaturation in said chamber whereby the size of particles filtered may be controlled.

2. In a small particle filter, the combination of means defining first elongated chamber adapted to have a particle bearing gaseous medium flow therethrough, means defining a second elongated chamber adapted to hold a supply of vaporizable fluid and communicating with said first chamber, a fluid absorbent means extending from said second chamber into said first chamber, means to produce controlled supersaturation in said first chamber whereby condensation occurs about particles larger than a given size, said means to produce supersaturation including an electrical conductor adapted to have a current pass therethrough positioned within and extending the length of said first chamber, said electrical conductor positioned adjacent to one portion of said fluid absorbent means whereby a temperature gradient is established within first chamber means and a portion of said fluid is vaporized.

3. A small particle filter according to claim 2, including a means to vary the current through said conductor whereby the temperature gradient, vaporization rate and the degree of supersaturation is controlled.

References Cited in the file of this patent

UNITED STATES PATENTS

| | | |
|---|---|---|
| 2,676,266 | Cowan | Apr. 20, 1954 |
| 2,684,008 | Vonnegut | July 20, 1954 |

OTHER REFERENCES

AECD-2711 Atomic Energy Commission Document, dated October 3, 1949, pp. 2, 5.

Fahnoe et al.: Ind. & Eng. Chem. vol. 43, No. 6, June 1951, pp. 1336–469 (especially pages 1337, 1342–3).

Schaefer, Ind. & Eng. Chem., vol. 44, No. 6, June 1952, pp. 1381–3.

ORNL-1957, Atomic Energy Comm. Document, dated October 27, 1955, pp. 16, 17.